United States Patent [19]

Combot-Courrau et al.

[11] Patent Number: 5,445,395
[45] Date of Patent: Aug. 29, 1995

[54] SEALING DEVICE FOR A QUICK-CONNECTION COUPLING HAVING CLAWS OR A CLAMP

[75] Inventors: Yves Combot-Courrau, Thorigne Fouillard; Benoît Le Saint, Rennes; Jean-Noël Musellec, Rennes; Philippe Le Quere, Rennes, all of France

[73] Assignee: Legris S.A., Rennes, France

[21] Appl. No.: 210,389

[22] Filed: Mar. 18, 1994

[30] Foreign Application Priority Data

Mar. 19, 1993 [FR] France .................. 93 03197

[51] Int. Cl.⁶ .................................. F16J 15/24
[52] U.S. Cl. ................... 277/207A; 277/165; 285/910
[58] Field of Search .............. 277/165, 207 A, 211; 285/328, 332.1, 910, 168, 178, 207 R

[56] References Cited

U.S. PATENT DOCUMENTS 3,366,392  1/1968  Kennel .
3,544,119  12/1970  Glover .......................... 277/207 A
3,741,570  6/1973  Garrett ......................... 277/207 A
3,885,800  5/1975  Sievenpiper ..................... 277/165
4,052,112  10/1977  Faber .
4,190,259  2/1980  Zitting .
4,336,946  6/1982  Wheeler ........................ 277/165

FOREIGN PATENT DOCUMENTS 2094278  1/1972  France .
1033756  6/1966  United Kingdom ........... 277/207 A Primary Examiner—Daniel G. DePumpo
Attorney, Agent, or Firm—Griffin, Butler, Whisenhunt & Kurtossy

[57] ABSTRACT

A gasket for a claw or clamp quick-connection coupling, the gasket being constituted by a circularly symmetrical annular body defined by two parallel radial faces, an outer cylindrical surface surmounted by a partially toroidal bulge centered on the midplane of the gasket parallel to the radial faces, a partially toroidal inner surface also centered on the midplane, and connected to each of the radial faces via a respective chamfer-forming conical surface.

4 Claims, 1 Drawing Sheet

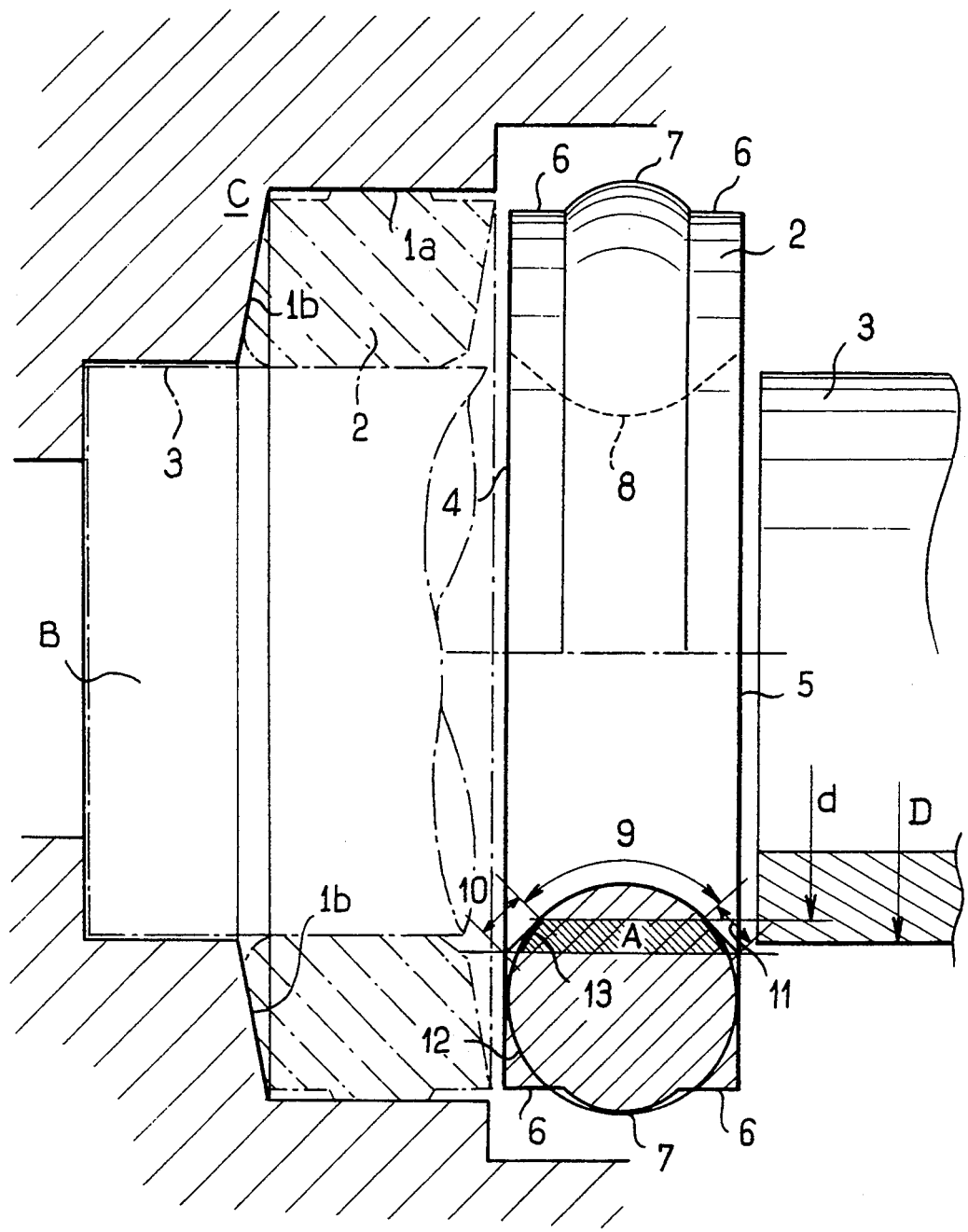

SEALING DEVICE FOR A QUICK-CONNECTION COUPLING HAVING CLAWS OR A CLAMP

The invention relates to a device for use in a quick-connection coupling to achieve sealing between the body of the coupling and the outside surface of a tube inserted in said body.

BACKGROUND OF THE INVENTION

It is briefly recalled that a quick-connection coupling includes means for retaining the end of the duct in a bore designed to receive said end. Such means are of two main types: claws, i.e. arms extending substantially parallel to the outside surface of the tube and uniformly distributed thereabout, with the free ends of the arms being provided with respective teeth directed towards the surface of the tube while the body of the coupling includes a camming surface for engaging the opposite surfaces of the arms so as to force the teeth to penetrate into the outside surface of the tube should the tube be subjected to force in the extraction direction; while the second type is constituted by a washer whose inside edge is subdivided into teeth that extend substantially over a conical surface and that bite into the surface of the tube.

In addition to the above retaining means, a quick-connection coupling also includes at least one sealing gasket which is situated beyond the fastening means of the coupling in the direction in which the tube is inserted into the body of the coupling. In most cases, the sealing means is constituted by an O-ring that extends between a cylindrical bearing surface of the bore in the body and the outside surface of the tube that is inserted therein.

An O-ring presents numerous drawbacks. Firstly, when the tube is inserted, the end of the tube tends to come into abutment against the outside surface of the ring and to adhere thereto so as to cause it to rotate about itself, thus subjecting the inside of the ring to local stresses, necking, and deformation that impair the quality of the sealing obtained and also the lifetime of the O-ring. In addition, such an O-ring is poorly adapted to receiving tubes having outside diameters that, for reasons of manufacturing tolerance, vary considerably about a nominal value from one tube to another. Finally, O-rings are highly sensitive to ovalization of the tube received in the coupling, such that ovalization is almost certain to constitute a source of leakage.

OBJECT AND SUMMARY OF THE INVENTION

The object of the present invention is to remedy the drawbacks of O-rings by proposing a sealing device for providing sealing between the body of a quick-connection coupling and a tube by implementing means that are better adapted to achieving such sealing than is a mere O-ring.

In the device of the invention, one of said means is the sealing gasket itself which is constituted by a circularly symmetrical annular body defined by two parallel radial faces, an outer cylindrical surface surmounted by a partially toroidal bulge centered on the midplane of the gasket parallel to its faces, and a partially toroidal inside surface also centered on the midplane and connected to each radial face via a chamfer-forming conical surface.

The above shape is advantageous in that it takes into consideration the fact that the diameter of the cylindrical bearing surface formed in the body of the coupling and the dimensions of the gasket are controlled during manufacture with much greater accuracy than is the outside diameter of the tube to be received in the body of the coupling. It therefore suffices for the gasket to be lightly clamped within the coupling for good sealing to be ensured, with such a small amount of clamping taking place over the small area of the outer bulge. In addition, the cylindrical surface adjacent to said bulge on the outside of the gasket constitutes means for preventing the gasket from rolling about itself when the tube is inserted.

Further, the chamfer constituted by each conical portion of the inside surface constitutes a guide for the tube that is better than the toroidal portion of the inside surface of an ordinary O-ring.

Preferably, the radius of the toroidal bulge is smaller than the radius of the inside toroidal surface.

Thus, for a given nominal diameter, it is possible to provide the gasket with a minimum inside diameter that is smaller than that of a conventional O-ring, thereby making it possible to be sure of taking account of large variations in a given nominal outside diameter for a tube, thus making it possible to ensure effective clamping of the gasket on the tube for a given nominal diameter, regardless of its real diameter, thereby providing improved ability to accommodate tube ovalization, and even to counter such ovalization, while not making it more difficult to insert the tube in the gasket and while avoiding deformation of the tube by the gasket.

The invention also provides a stop shoulder for the gasket inside the coupling body which shoulder is in the shape of a conical cup so as to leave room to allow gasket material to move axially during insertion of the tube, thereby facilitating such insertion.

Other characteristics and advantages of the invention appear from the following description of an embodiment of the invention given by way of example.

BRIEF DESCRIPTION OF THE DRAWING

Reference is made to the accompany drawing in which the sole FIGURE shows a gasket of the invention.

MORE DETAILED DESCRIPTION

The FIGURE is a diagrammatic illustration on a large scale of the body C of a quick-connection coupling whose claws or clamps are omitted from the FIGURE, but if shown would be situated on the right of the FIGURE. The body C includes a bore B that is stepped, thus presenting at least one cylindrical bearing surface $1a$ and at least one shoulder $1b$. The surface $1a$ is designed to receive a gasket 2 to provide sealing between the end 3 of a tube and the body C, the shoulder $1b$ forming an axial thrust abutment for the gasket 2 when it is installed in the body C.

The gasket 2 is an annular body axially defined by two parallel faces 4 and 5 and outwardly defined by a cylindrical surface 6. In the center of the cylindrical surface, i.e. in a portion thereof that is equidistant from the faces 4 and 5, there is an outwardly extending bulge 7 having a toroidal outside surface. By way of indication, the outside diameter of the bulge may be about 5% to 10% greater than the diameter of the cylindrical surface 6. When the gasket 2 is inserted in the bearing surface 1, only the bulge is slightly compressed, with tolerance in the manufacturing dimensions both for the diameter of the bearing surface and for the diameter of the bulge and of the cylindrical surface 6 being such that even such a small amount of compression suffices to achieve good sealing at said bearing surface.

The inside surface 8 of the sealing ring includes a toroidal central portion 9 and two conical side portions 10 and 11 which are tangential to said central toroidal portion and which form a chamfer for insertion of the tube 3. By way of example, it may be observed that in a preferred embodiment, the half angle at the apex of the cone is of the order of 42° to 43°.

This FIGURE shows the section of the O-ring 12 that is equivalent to the gasket of the invention. It will be understood that the conical zone 10 and 11 enables a tube to be inserted whose outside diameter is greater than that which can be accepted by the O-ring since in this position the O-ring has a surface 13 that is much steeper relative to the end of the tube. In other words, the O-ring 12 which is equivalent to the gasket of the invention from the dimensional point of view can only accept under the same conditions tubes of diameter d that is smaller than the diameter D of the tube 3. Thus, for a given tube diameter, it is possible to have a greater thickness of the gasket than is possible with a conventional O-ring, the extra matter being indicated by a shaded strip A. The clamping applied to the tube by the gasket is thus greater with the device of the invention which constitutes a kind of hoop around the tube applying force to the tube and opposing any ovalization thereof, or at worst accommodating any ovalization thereof better than an ordinary O-ring.

Although it is necessary to compress more matter when inserting a tube into a gasket of the present invention than into a conventional O-ring as shown above, the presence of the insertion chamfers makes such insertion easier. Furthermore, if the shoulder 1b is given a conical shape, then matter of the gasket can be entrained axially during insertion of the tube 3, thereby deforming it into the shape shown in chain-dotted lines in the FIGURE, thus further improving insertion of the tube into the body C. In addition, the presence of the cylindrical portions 6 on either side of the bulge 7 limits the amount of twisting about its own axis to which the gasket is subjected by engagement against the bearing surface 1 whenever a tube is inserted or extracted.

Finally, it may be observed that the gasket of the invention is symmetrical and that the force required for inserting it in the bearing surface 1 is smaller than the force required for housing a dimensionally equivalent conventional O-ring. This makes assembly easier, particularly when performed automatically.

We claim:

1. A sealing device for a tube housed in a bore of a body, in particular a quick-connection coupling, said bore including a cylindrical bearing surface and a shoulder, and the device comprising a gasket extending between the tube and the cylindrical bearing surface and having a cylindrical annular body defined by two parallel radial faces, an outer cylindrical surface and an inner surface wherein said outer cylindrical surface is surmounted by a partially toroidal bulge centered on a midplane of the gasket parallel to said radial faces, and wherein said inner surface has a central toroidal portion centered on the midplane which is connected to each of the radial faces via a respective chamfer-forming conical surface.

2. A device according to claim 1, wherein a radius of the toroidal bulge is smaller than a radius of the inner toroidal surface.

3. A device according to claim 1, wherein the shoulder of the bore forms a conical surface whose apex points in the same direction as the direction in which the tube is inserted in the bore.

4. A device according to claim 3, wherein the conical surface has an apex half angle of the order of 42° to 43°.

* * * * *